(12) United States Patent
Chen et al.

(10) Patent No.: US 9,774,263 B1
(45) Date of Patent: Sep. 26, 2017

(54) POWER CONVERTER WITH EXTENDED HOLD-UP TIME

(71) Applicant: SCHNEIDER ELECTRIC IT CORPORATION, West Kingston, RI (US)

(72) Inventors: Hui-Jung Chen, Taipei (TW); Damir Klikic, Waltham, MA (US); Kuo-Liang Lee, Taiwan (CN); Hsuang-Chang Chiang, New Taipei (TW)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 0 days.

(21) Appl. No.: 15/229,151

(22) Filed: Aug. 5, 2016

(51) Int. Cl.
| | |
|---|---|
| *H02M 3/337* | (2006.01) |
| *H02M 3/335* | (2006.01) |
| *H02M 1/08* | (2006.01) |
| *H02M 1/00* | (2006.01) |

(52) U.S. Cl.
CPC ......... *H02M 3/33507* (2013.01); *H02M 1/08* (2013.01); *H02M 3/337* (2013.01); *H02M 3/3372* (2013.01); *H02M 3/3376* (2013.01); *H02M 3/3378* (2013.01); *H02M 3/33569* (2013.01); *H02M 2001/0009* (2013.01)

(58) Field of Classification Search
CPC .. H02M 3/337; H02M 3/3372; H02M 3/3376; H02M 3/3378; H02M 3/33569
See application file for complete search history.

(56) References Cited

U.S. PATENT DOCUMENTS

| | | | |
|---|---|---|---|
| 6,504,497 B2 | 1/2003 | Jang et al. | |
| 7,061,212 B2 | 6/2006 | Phadke | |
| 7,573,731 B2 | 8/2009 | Kwon et al. | |
| 8,379,421 B2 | 2/2013 | Nishijima | |
| 8,736,240 B2 | 5/2014 | Liu et al. | |
| 9,391,532 B2* | 7/2016 | Reiter | H02M 3/3376 |
| 2014/0043861 A1* | 2/2014 | Luh | H02M 3/33576 363/17 |
| 2014/0334195 A1* | 11/2014 | Nussbaum | H02M 3/3376 363/21.04 |

* cited by examiner

*Primary Examiner* — Timothy J Dole
*Assistant Examiner* — Ishrat Jamali
(74) *Attorney, Agent, or Firm* — Lando & Anastasi, LLP

(57) ABSTRACT

According to one aspect, embodiments herein provide an AC-DC converter comprising a rectifier, a capacitor, a DC bus coupled to the capacitor, a plurality of first switches coupled to the DC bus, a plurality of second switches coupled between the rectifier and the first switches, a transformer having a primary winding and a secondary winding, the primary winding coupled to the plurality of first switches, the plurality of second switches, and the rectifier, and the secondary winding coupled to an output, and a controller configured, in response to a determination that the input AC power is acceptable, to operate the plurality of second switches and the plurality of first switches such that output DC voltage is maintained at a desired output DC voltage level, and operate the plurality of first switches such that a DC bus voltage on the DC bus is maintained at a desired DC bus voltage level.

18 Claims, 15 Drawing Sheets

POWER CONVERTER WITH EXTENDED HOLD-UP TIME

BACKGROUND OF THE INVENTION

1. Field of Invention

The present invention relates generally to systems and methods for providing AC to DC conversion.

2. Discussion of Related Art

AC-DC converters are commonly used in a variety of applications to convert supplied AC power into DC power having a desired voltage level. For example, AC-DC converters are often used as battery chargers or front end converters in high frequency isolated Uninterruptible Power Supply (UPS) systems, in telecommunication systems for providing desired DC voltage (e.g., 48V) to a distribution bus, and in High Voltage Direct Current (HVDC) datacenter power supplies to provide desired DC voltage (e.g., 240V or 380V) to a distribution bus.

SUMMARY

At least one aspect of the invention is directed to an AC-DC converter system comprising an input configured to receive input AC power from an AC source, an output configured to provide output DC power having an output DC voltage to a load, a rectifier coupled to the input, a capacitor coupled to the rectifier, a DC bus coupled to the capacitor, a plurality of first switches coupled to the DC bus, a plurality of second switches coupled between the rectifier and the plurality of first switches, a transformer having a primary winding and a secondary winding, the primary winding coupled to the plurality of first switches, the plurality of second switches, and the rectifier, and the secondary winding coupled to the output, and a controller configured to monitor the input AC power and, in response to a determination that the input AC power is acceptable, to operate the plurality of second switches and the plurality of first switches such that the output DC voltage is maintained at a desired output DC voltage level, and operate the plurality of first switches such that a DC bus voltage on the DC bus is maintained at a desired DC bus voltage level.

According to one embodiment, in operating the plurality of second switches and the plurality of first switches such that the output DC voltage is maintained at the desired output DC voltage level, the controller is further configured to operate the plurality of second switches and the plurality of first switches in a complementary manner. In another embodiment, in operating the plurality of first switches such that a DC bus voltage on the DC bus is maintained at a desired DC bus voltage level, the controller is further configured to reduce a duty cycle of a control signal provided to the plurality of first switches in response to the DC bus voltage approaching the desired DC bus voltage level.

According to another embodiment, the AC-DC converter system further comprises a first inductor, wherein the primary winding of the transformer includes a center tap and wherein the center tap is coupled to the rectifier via the first inductor. In one embodiment, the AC-DC converter system further comprises a second inductor, wherein the primary winding is coupled to the plurality of first switches via the second inductor. In another embodiment, the AC-DC converter system further comprises a third inductor, wherein the primary winding is coupled to the plurality of second switches via the third inductor.

According to one embodiment, in response to a determination that the input power is unacceptable, the controller is further configured to operate, in a hold-up mode of operation, the plurality of second switches and the plurality of first switches to draw energy from the capacitor such that the output DC voltage is maintained at the desired output DC voltage level for a hold-up period of time. In one embodiment, the hold-up period of time is at least 10 ms. In another embodiment, in operating the plurality of second switches and the plurality of first switches in the hold-up mode of operation, the controller is further configured to operate the plurality of second switches and the plurality of first switches in a full-bridge phase shift mode of operation. In another embodiment, in operating the plurality of second switches and the plurality of first switches in the hold-up mode of operation, the controller is further configured to operate the plurality of second switches and the plurality of first switches in a full-bridge Pulse Width Modulation (PWM) mode of operation.

Another aspect of the invention is directed to a method for operating an AC-DC converter system comprising an input, an output, a rectifier coupled to the input, a capacitor coupled to the rectifier, a DC bus coupled to the capacitor, a plurality of first switches coupled to the DC bus, a plurality of second switches coupled between the rectifier and the plurality of first switches, and a transformer having a primary winding and a secondary winding, the primary winding coupled to the plurality of first switches, the plurality of second switches, and the rectifier, and the secondary winding coupled to the output, wherein the method comprises acts of receiving input AC power at the input from an AC source, determining whether the input AC power is acceptable, in response to a determination that the AC power is acceptable, operating the plurality of second switches and the plurality of first switches such that an output DC voltage level is maintained at the output, and in response to a determination that the AC power is acceptable, operating the plurality of first switches such that a DC bus voltage level is maintained on the DC bus.

According to one embodiment, the act of operating the plurality of second switches and the plurality of first switches such that the output DC voltage level is maintained at the output includes operating the plurality of second switches and the plurality of first switches in a complementary manner. In one embodiment, the act of operating the plurality of second switches and the plurality of first switches such that the output DC voltage level is maintained at the output further includes acts of monitoring the output DC voltage level, comparing the output DC voltage level to a reference output voltage level, and operating, based on the act of comparing the output DC voltage level to the reference output voltage level, the plurality of second switches and the plurality of first switches to drive the output DC voltage level towards the reference output voltage level. In another embodiment, the act of operating the plurality of first switches such that the DC bus voltage level is maintained on the DC bus further includes acts of monitoring the DC bus voltage level, comparing the DC bus voltage level to a reference bus voltage level, and operating, based on the act of comparing the DC bus voltage level to the reference bus voltage level, the plurality of first switches to drive the DC bus voltage level towards the reference bus voltage level.

According to another embodiment, the act of operating the plurality of first switches to drive the DC bus voltage level towards the reference bus voltage level includes reducing a duty cycle of a control signal provided to the plurality of first switches in response to the DC bus voltage approaching the desired DC bus voltage level. In one embodiment, reducing the duty cycle of the control signal includes reducing the duty cycle of the control signal by a factor of K, and the method further comprises an act of calculating, with a Proportional-Integral (PI) controller based on the act of comparing the DC bus voltage level to the reference bus voltage level, the factor of K.

According to one embodiment, the method further comprises in response to a determination that the AC power is unacceptable, operating, in a hold-up mode of operation, the plurality of second switches and the plurality of first switches to draw energy from the capacitor such that the output DC voltage level is maintained at the output for a hold-up period of time. In one embodiment, operating the plurality of second switches and the plurality of first switches in the hold-up mode of operation includes operating the plurality of second switches and the plurality of first switches in one of a full-bridge phase shift mode of operation and a full-bridge PWM mode of operation.

At least one aspect of the invention is directed to an AC-DC converter system comprising an input configured to receive input AC power from an AC source, an output configured to provide output DC power having an output DC voltage to a load, a rectifier coupled to the input, a capacitor coupled to the rectifier, a DC bus coupled to the capacitor, a transformer coupled between the rectifier and the output, means for maintaining an output DC voltage level at the output when the input AC power received at the input is acceptable, and means for maintaining a DC bus voltage level on the DC bus when the input AC power received at the input is acceptable. In one embodiment, the AC-DC converter system further comprises means for maintaining the output DC voltage level at the output for a hold-up period of time when the input AC power received at the input is unacceptable.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
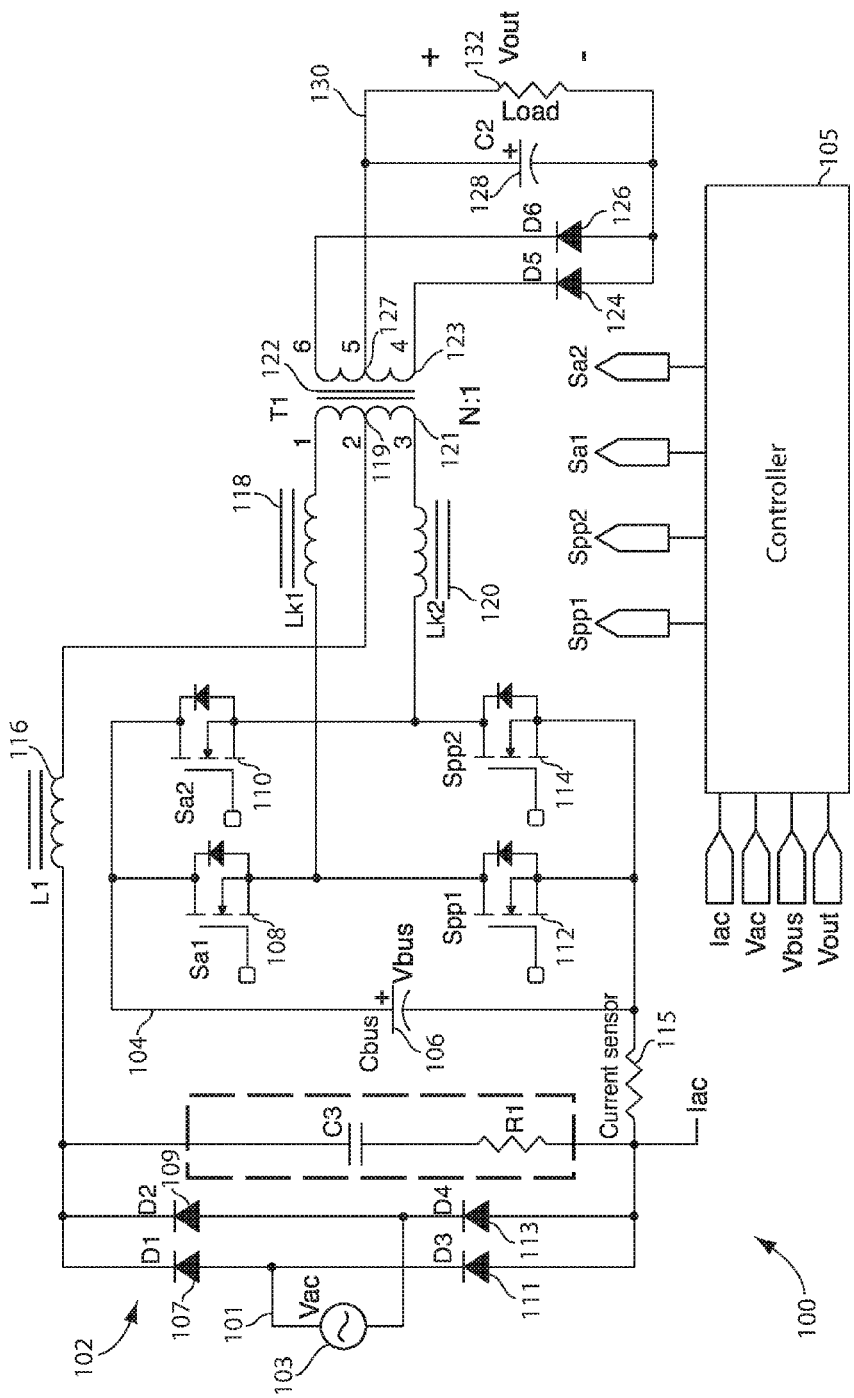
FIG. 1 is a circuit diagram of an AC-DC power converter according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, AC-DC converters are commonly used in a variety of different applications to convert input AC power into output DC power having a desired voltage level. AC-DC converters can include a hold-up time extension circuit that is configured to maintain the output voltage of the converter at a constant level despite the input AC power failing or falling to an insufficient level. Common hold-up time extension circuits typically add an extra and/or intermediate converter to the AC/DC converter. These extra circuits/converters can result in additional cost and also additional power losses. Such additional power losses may result in reduced power density (e.g., due to large bulk capacitors) and/or reduced efficiency.

A power converter is provided that outputs a constant voltage in a normal mode of operation (i.e. when input power is acceptable) and continues to output the constant voltage in a hold-up extension mode of operation when input power provided to the converter is interrupted. The power converter operates without employing the intermediate converters and large bulk capacitors described above.

FIG. 1 is a circuit diagram of an AC-DC power converter 100 according to aspects described herein. The converter 100 includes an AC input 101, a rectifier 102 (including diodes D1 107, D2 109, D3 111, and D4 113), a DC bus 104, a DC bus capacitor (Cbus) 106, a first active clamp switch (Sa1) 108, a second active clamp switch (Sa2) 110, a first push-pull switch (Spp1) 112, a second push-pull switch (Spp2) 114, an inductor L1 116, an inductor Lk1 118, an inductor Lk2 120, a transformer (T1) 122, a diode D5 124, a diode D6 126, an output capacitor (C2) 128, and a DC output 130. According to one embodiment the switches (Sa1 108, Sa2 110, Spp1 112, Spp2 114) in the converter 100 are Metal-Oxide-Semiconductor Field-Effect Transistors (MOSFET); however, in other embodiments, each switch may be another appropriate type of switch or transistor.

The AC input 101 is configured to be coupled to an AC source 103 having a positive and a negative terminal. The rectifier 102 is coupled to the AC input 101. More specifically, the anode of diode D1 107 is coupled to the positive terminal of the AC source 103 and to the cathode of diode D3 111. The anode of diode D2 109 is coupled to the negative terminal of the AC source 103 and the cathode of diode D4 113. The cathodes of diodes D1 107 and D2 109 are coupled to a first terminal of inductor L1 116. A second terminal of inductor L1 116 is coupled to a center tap 119 of a primary winding 121 of the transformer (T1) 122.

The cathodes of diodes D3 111 and D4 113 are coupled to the source of switch Spp1 112 and to the source of switch Spp2 114. A negative terminal of the DC bus capacitor (Cbus) 106 is also coupled to the source of switch Spp1 112 and to the source of switch Spp2 114. A positive terminal of the DC bus capacitor (Cbus) 106 is coupled to the drains of switches Sa1 108 and Sa2 110 via the DC bus 104. The source of switch Sa1 108 is coupled to the drain of switch Spp1 112 and to a first terminal of inductor Lk1 118. A second terminal of inductor Lk2 118 is coupled to a first end of the primary winding 121 of the transformer (T1) 122. The source of switch Sa2 110 is coupled to the drain of switch Spp2 114 and to a first terminal of inductor Lk2 120. A second terminal of inductor Lk2 is coupled to a second end of the primary winding 121 of the transformer (T1) 122.

A first end of a secondary winding 123 of the transformer (T1) 122 is coupled to the cathode of diode D6 126. A second end of the secondary winding 123 of the transformer (T1) 122 is coupled to the cathode of diode D5 124. The anodes of diodes D5 125 and D6 126 are coupled to a negative terminal of the output capacitor (C2) 128. A center tap 127 of the secondary winding 123 of the transformer (T1) is coupled to a positive terminal of the output capacitor (C2) 128. The positive terminal of the output capacitor 128 is also coupled to the output 130. The output 130 is configured to be coupled to a load 132.

According to at least one embodiment, the converter 100 also includes a controller 105. The controller 105 is coupled to the gates of the switches (Sa1 108, Sa2 110, Spp1 112, Spp2 114) in the converter 100 and is configured to operate the switches via control signals. The controller 105 is also coupled to the input 101, the DC bus 104, and the output 130 and is configured to monitor input AC voltage (Vac) provided to the input 101 by the AC source 103, DC voltage (Vbus) on the DC bus 104, and DC voltage (Vout) at the output 130. In one embodiment, the controller 105 is further coupled to a current sensor 115 (e.g., a resistor) coupled between the anode of diode D3 and the source of switch Spp1 112 and is configured to monitor current (Iac) through the current sensor 115.

Figure 2:
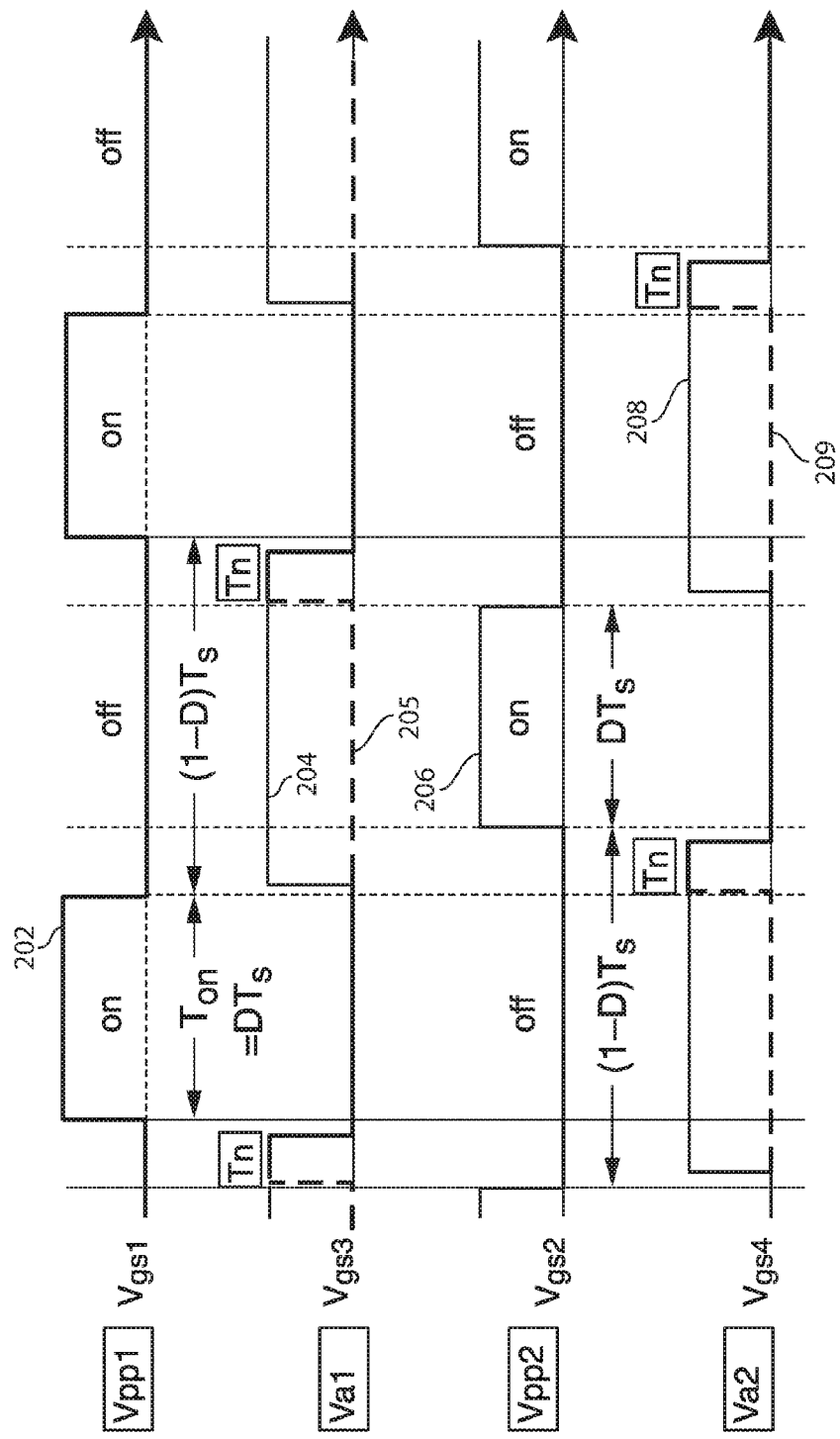
FIG. 2 is a timing diagram illustrating control signals provided to an AC-DC power converter according to aspects described herein.
Figure 3:
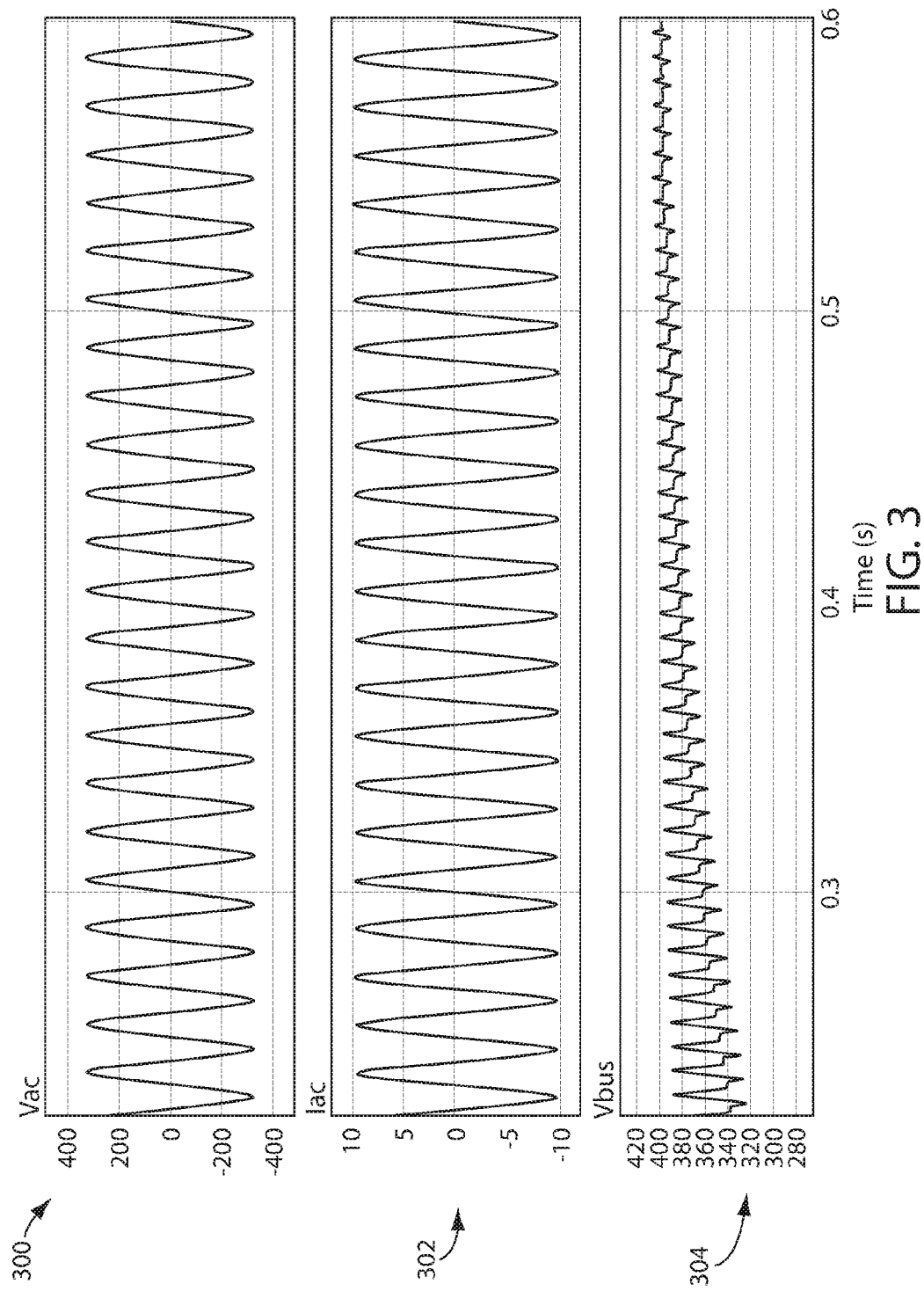
FIG. 3 includes graphs illustrating different parameters of an AC-DC converter according to aspects described herein.

Operation of the converter 100 is discussed below with respect to FIGS. 2-3. FIG. 2 is a timing diagram 200 illustrating control signals provided to the switches (Sa1 108, Sa2 110, Spp1 112, Spp2 114) by the controller 105 during operation of the converter 100. The timing diagram 200 includes a first trace 202 representing a control signal provided by the controller 105 to the gate of push-pull switch Spp1 112, a second trace 204 representing a control signal provided by the controller 105 to the gate of active clamp switch Sa1 108, a third trace 206 representing a control signal provided by the controller 105 to the gate of push-pull switch Spp2 114, and a fourth trace 208 representing a control signal provided by the controller 105 to the gate of active clamp switch Sa2 110. FIG. 3 includes graphs illustrating different parameters of the converter 100. FIG. 3 includes a first graph 300 illustrating the input AC voltage (Vac) during operation of the converter 100, a second graph 302 illustrating current through the current sensor 115 (Iac) during operation of the converter 100, and a third graph 304 illustrating the voltage (Vbus) on the DC bus 104 during operation of the converter 100.

As shown in FIGS. 2-3, input AC power (e.g., having an input AC voltage level of 230 Vac) is provided to the input 101 of the converter 100 and the controller 105 monitors the input AC voltage level. In response to the input AC voltage level being acceptable (i.e., at least at a level to support a desired DC output voltage (Vout) of the converter 100), the controller 105 operates the push-pull switches (Spp1 112 and Spp2 114) and the active clamp switches (Sa1 108 and Sa2 110) in a complementary manner such that the desired DC output voltage (Vout) is provided to a load 132 coupled to the output 130. The controller 105 also operates the active clamp switches (Sa1 108 and Sa2 110) to regulate the voltage (Vbus) on the DC bus 104 to a desired level (e.g., 400 Vdc). As the voltage (Vbus) on the DC bus 104 approaches the desired level (e.g., 400 Vdc as shown in the third graph 304 of FIG. 3), the controller 105 operates the active clamp switches (Sa1 108 and Sa2 110) to maintain the voltage (Vbus) on the DC bus 104 at the desired level by reducing the amount of time at which the active clamp switches (Sa1 108 and Sa2 110) are on. For example, as shown in the second trace 204 and the fourth trace 208 of FIG. 2, as the voltage (Vbus) on the DC bus 104 approaches the desired level (shown in FIG. 3), the controller 105 operates the switches Sa1 108 and Sa2 110 to reduce the amount of time at which the switches Sa1 108 and Sa2 110 are on (i.e., reduce the duty cycle of the control signals 204, 208 provided to the switches 108, 110, for example as shown by dashed lines 205, 209). Control of the switches (Spp1 112, Spp2 114, Sa1 108, Sa2 110) by the controller 105 is discussed in greater detail below with respect to FIG. 4.

Figure 4:
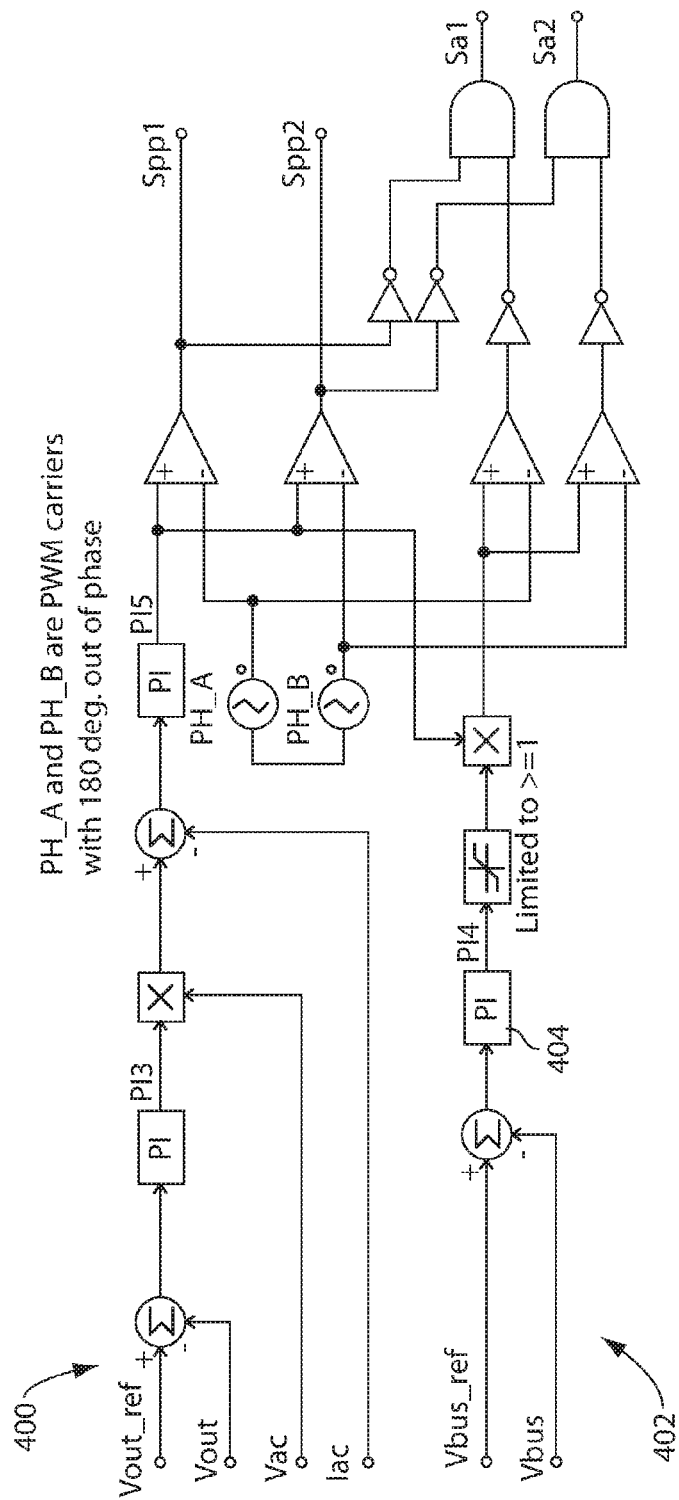
FIG. 4 is a block diagram illustrating control loops of an AC-DC converter according to aspects described herein.

FIG. 4 is a block diagram illustrating different control loops of the controller 105. A first control loop 400 of the controller 105 compares a predefined output voltage reference (Vout_ref) with the actual output voltage (Vout) of the converter 100 and operates the push-pull switches (Spp1 112 and Spp2 114) (i.e., adjusts the pulse width of control signals 202, 206 provided to the gates of the push-pull switches) based on the comparison to drive the output voltage (Vout)

of the converter 100 towards the output voltage reference (Vout_ref). A second control loop 402 of the controller 105 compares a predefined bus voltage reference (Vbus_ref) to the actual voltage (Vbus) on the bus 104 and operates the active clamp switches (Sa1 108 and Sa2 110) (i.e., adjusts the pulse width of control signals 204, 208 provided to the gates of the active clamp switches) based on the comparison to drive the voltage (Vbus) on the bus 104 towards the bus voltage reference (Vbus_ref).

As the voltage (Vbus) approaches the bus voltage reference (Vbus_ref), the "turn-on" times of the active clamp switches (Sa1 108 and Sa2 110) can be reduced (e.g., as shown in FIG. 2). For example, according to the one embodiment, the "turn-on" times of the active clamp switches (Sa1 108 and Sa2 110) are reduced by a factor of K which is defined by the output (PI4) of a Proportional-Integral (PI) controller 404 in the second control loop 402. As discussed in greater detail above, the bus voltage reference (Vbus_ref) is defined at a level such that a desired hold-up time of the output voltage (Vout) can be achieved when input AC power is interrupted.

Figure 5:
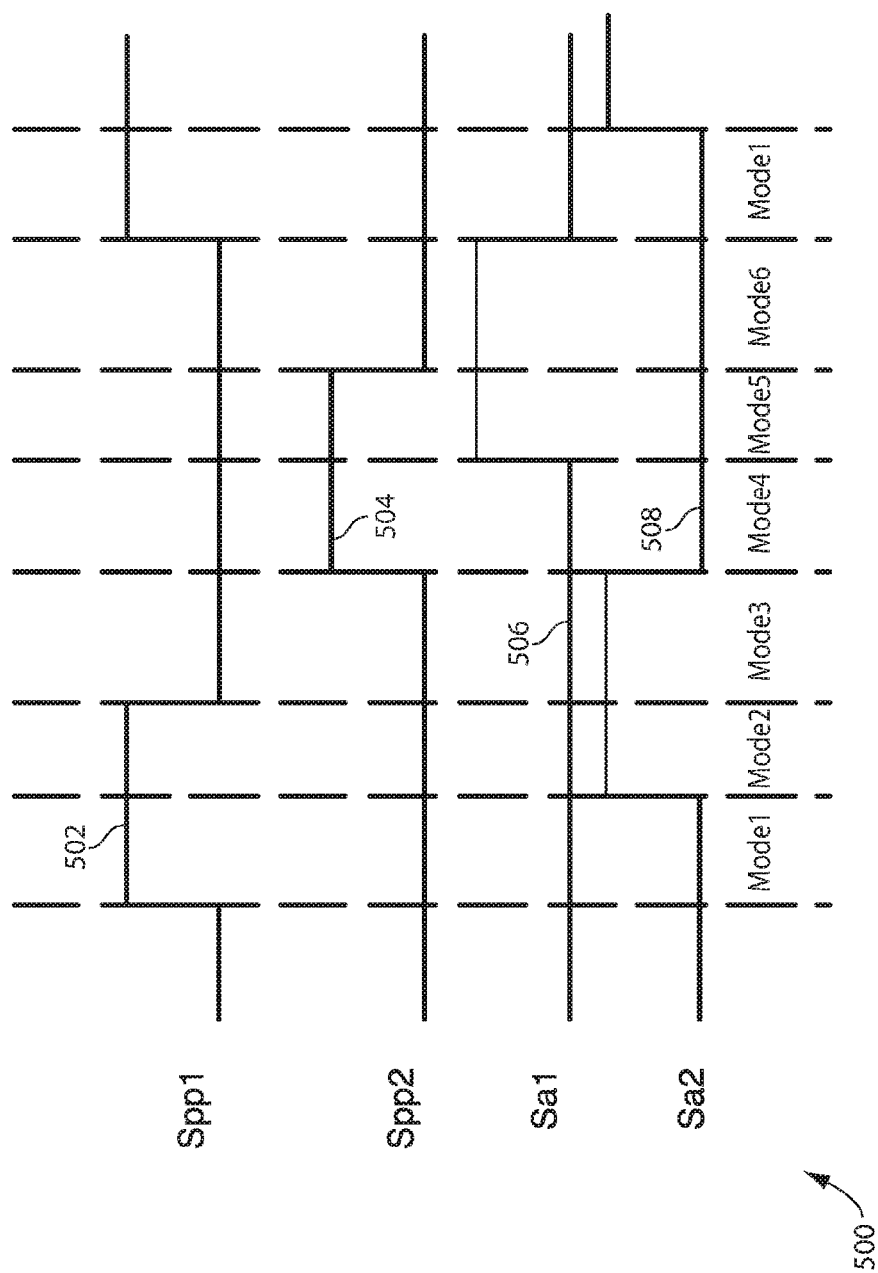
FIG. 5 is a timing diagram illustrating control signals provided to an AC-DC converter during different modes of operation according to aspects described herein.

FIG. 5 is a timing diagram 500 illustrating control signals provided to the switches (Sa1 108, Sa2 110, Spp1 112, Spp2 114) by the controller 105 during different modes of operation of the converter 100. The timing diagram 500 includes a first trace 502 representing a control signal provided by the controller 105 to the gate of push-pull switch Spp1 112, a second trace 504 representing a control signal provided by the controller 105 to the gate of push-pull switch Spp2 114, a third trace 506 representing a control signal provided by the controller 105 to the gate of active clamp switch Sa1 108, and a fourth trace 508 representing a control signal provided by the controller 105 to the gate of active clamp switch Sa2 110.

Figure 6:
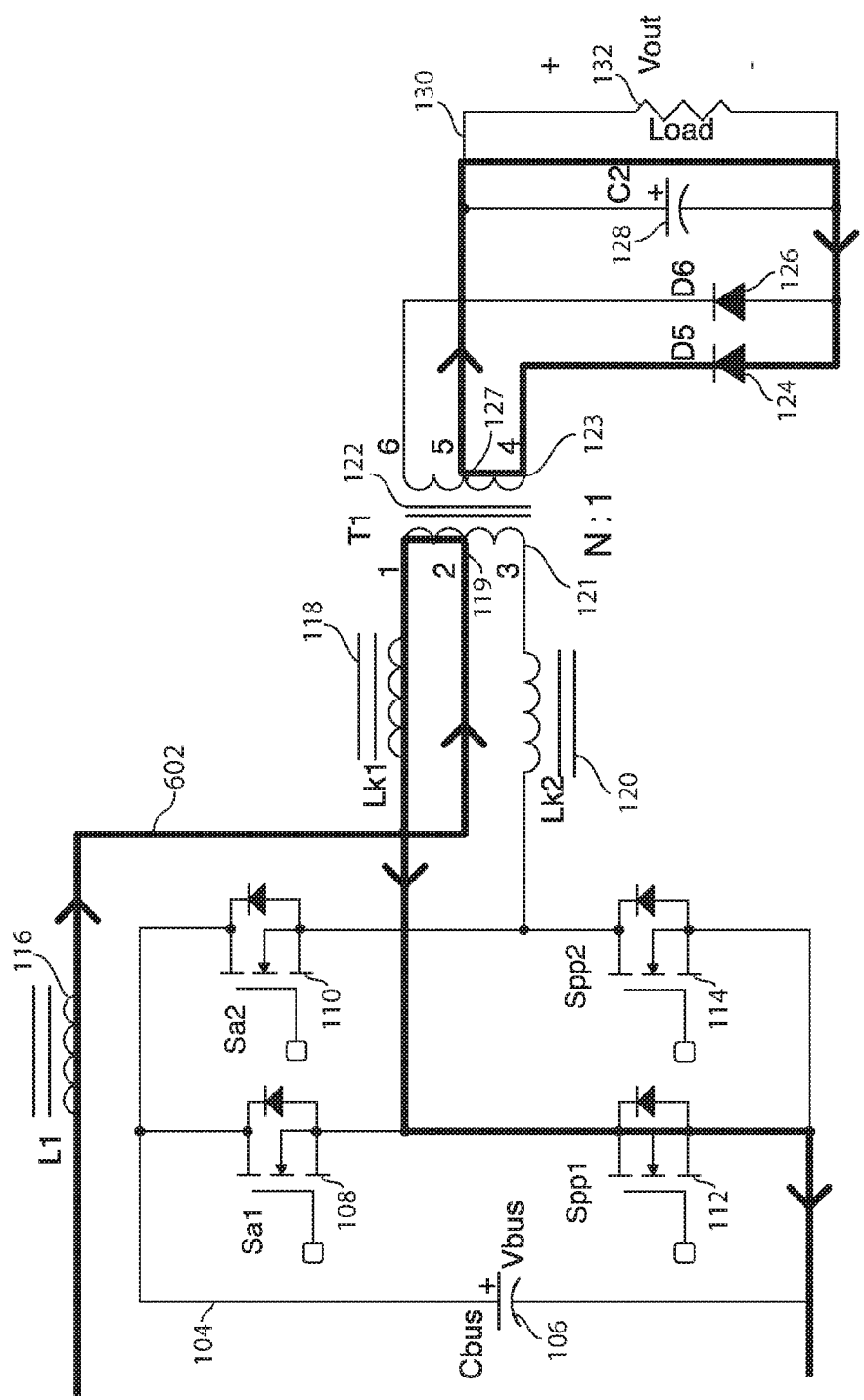
FIG. 6 is a circuit diagram illustrating operation of a portion of an AC-DC converter in a first mode of operation according to aspects described herein.

As shown in FIG. 5, in a first mode of operation, the controller 105 provides a high control signal 502 to the gate of push-pull switch Spp1 112 to operate the switch Spp1 112 to close and low control signals 504, 506, 508 to the gates of switches Spp2 114, Sa1 108, and Sa2 110 to maintain each of the switches 108, 110, 114 in an open state. FIG. 6 is a circuit diagram illustrating operation of a portion of the converter 100 in the first mode of operation. As shown in FIG. 6, in the first mode of operation, power derived from the AC input power is provided to the primary winding 121 of the transformer (T1) 122 via a power path 602 including the inductor L1 116, the center tap 119 of the primary winding 121 of the transformer (T1) 122, the inductor Lk1 118, and the push-pull switch Spp1 112. The resulting current in the primary winding 121 of the transformer (T1) 122 induces a current in the secondary winding 123 of the transformer (T1) 122 and corresponding DC power having an output DC voltage level (Vout) is provided to the output 130 (i.e., to the load 132 and to the output capacitor (C2) 128 to charge the capacitor).

Figure 7:
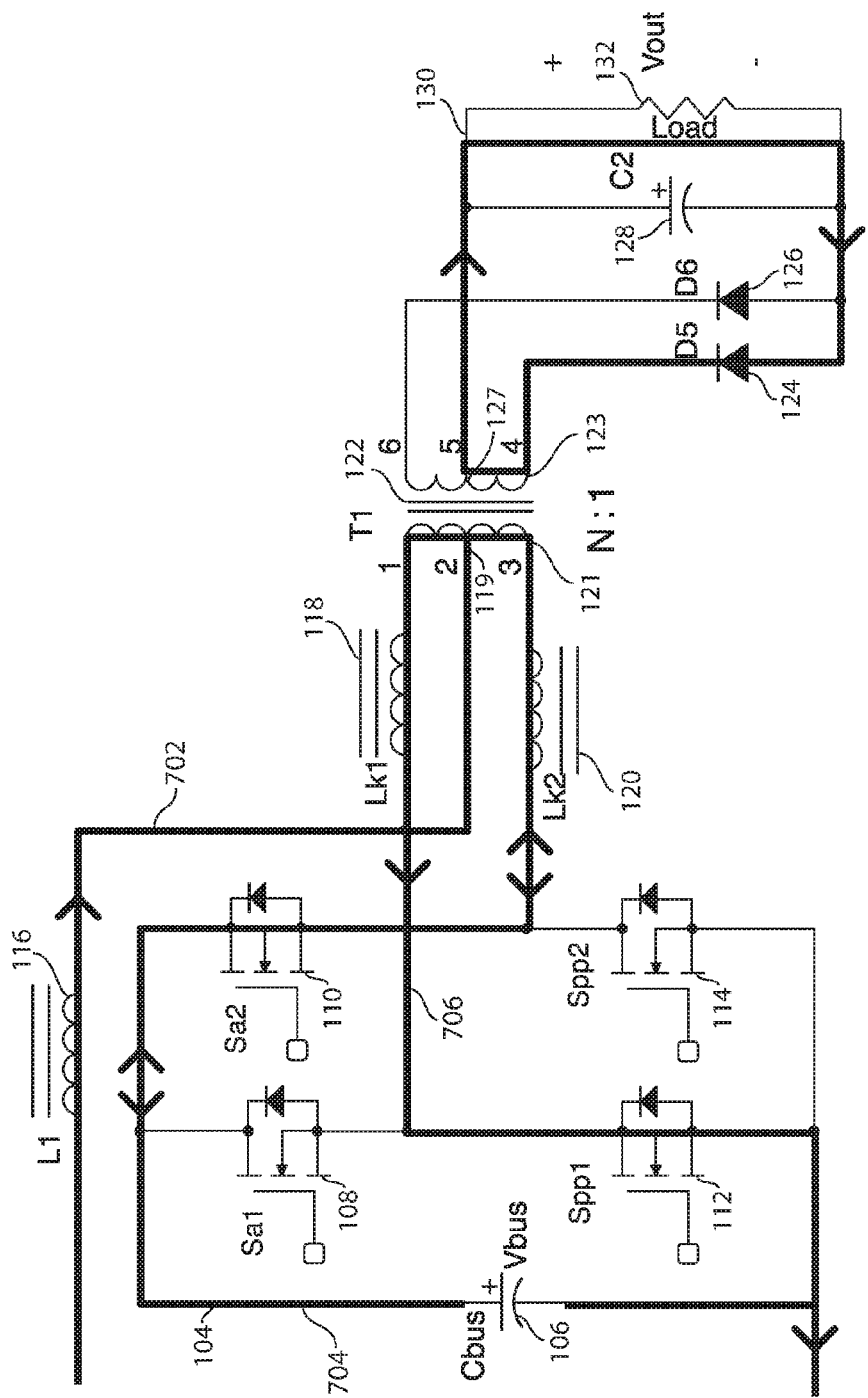
FIG. 7 is a circuit diagram illustrating operation of a portion of an AC-DC converter in a second mode of operation according to aspects described herein.

As shown in FIG. 5, in a second mode of operation, the controller 105 provides a high control signal 502 to the gate of push-pull switch Spp1 112 to maintain the switch Spp1 112 in a closed state and a high control signal 508 to the gate of active clamp switch Sa2 110 to operate the switch Sa2 110 to close. In the second mode of operation, the controller 105 also provides low control signals 504, 506 to the gates of switches Spp2 114 and Sa1 108 to maintain each of the switches 108, 114 in an open state. FIG. 7 is a circuit diagram illustrating operation of a portion of the converter 100 in the second mode of operation. As shown in FIG. 7, in the second mode of operation, power derived from the AC input power is provided to the center tap 119 of the primary winding 121 of the transformer (T1) 122 via a first power path 702 including the inductor L1 116. During the second mode of operation, power is also provided from the center tap 119 of the primary winding 121 of the transformer (T1) 122 to the DC bus capacitor (Cbus) 106 via a second power path 704 and back to the rectifier 102 via a third power path 706. The second power path 704 includes a portion of the primary winding 121 of the transformer (T1) 122, the inductor Lk2 120, active clamp switch Sa2 110, and the DC bus 104. The third power path 706 includes a portion of the primary winding 121 of the transformer (T1) 122, the inductor Lk1 118, and the push-pull switch Spp1 112.

In the second mode of operation, the current 704 through the active clamp switch Sa2 110 is bidirectional (i.e., can either provide energy to the DC bus capacitor (Cbus) 106 or draw energy from the capacitor 106) depending on whether the voltage (Vbus) across the bus 104 is less than or greater than a voltage level between the primary winding 121 of the transformer (T1) 122 and the inductor Lk2 120. The resulting current in the primary winding 121 of the transformer (T1) 122, generated by the first, second, and third power paths 702, 704, 706, induces a current in the secondary winding 123 of the transformer (T1) 122 and corresponding DC power having an output DC voltage level (Vout) is provided to the output 130 (i.e., to the load 132 and to the output capacitor (C2) 128 to charge the capacitor).

Figure 8:
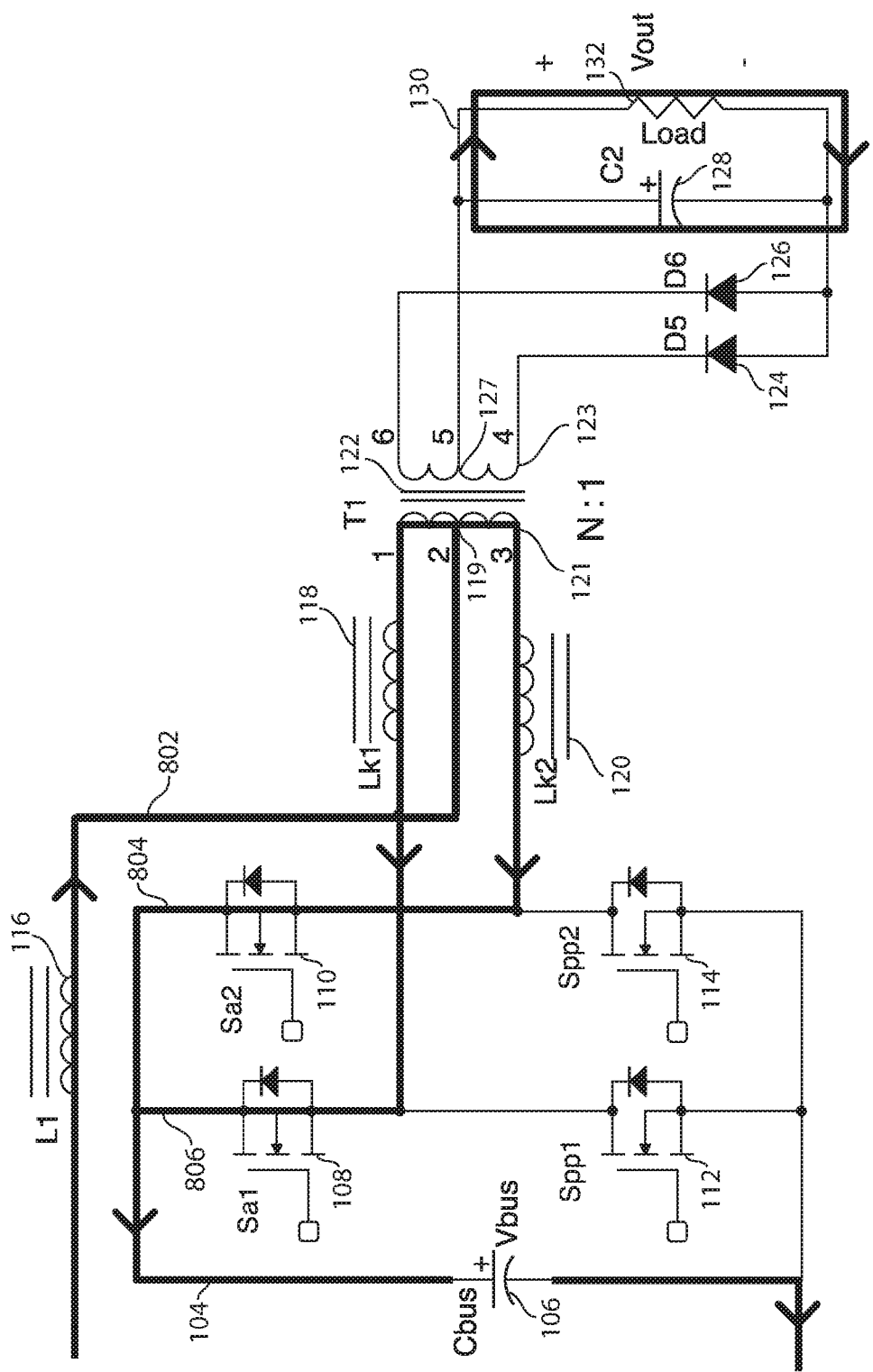
FIG. 8 is a circuit diagram illustrating operation of a portion of an AC-DC converter in a third (and sixth) mode of operation according to aspects described herein.

As shown in FIG. 5, in a third mode of operation, the controller 105 provides a high control signal 508 to the gate of active clamp switch Sa2 110 to operate the switch Sa2 110 to close and low control signals 502, 504, 506 to the gates of switches Spp1 112, Spp2, 114, and Sa1 108 to maintain each of the switches in an open state. FIG. 8 is a circuit diagram illustrating operation of a portion of the converter 100 in the third mode of operation. As shown in FIG. 8, in the third mode of operation, power derived from the AC input power is provided to the center tap 119 of the primary winding 121 of the transformer (T1) 122 via a first power path 802 including the inductor L1 116. During the third mode of operation, power is also provided from the center tap 119 of the primary winding 121 of the transformer (T1) 122 to the DC bus capacitor (Cbus) 106 via a second power path 804 and a third power path 806. The second power path 804 path includes inductor Lk2 120, the active clamp switch Sa2 110, and the DC bus 104. The third power path 806 includes inductor Lk1 118, a body diode of active clamp switch Sa1 108, and the DC bus 104. Also in the third mode of operation, the output capacitor (C2) 128 discharges and provides DC power having an output DC voltage level (Vout) to the load 132.

Figure 9:
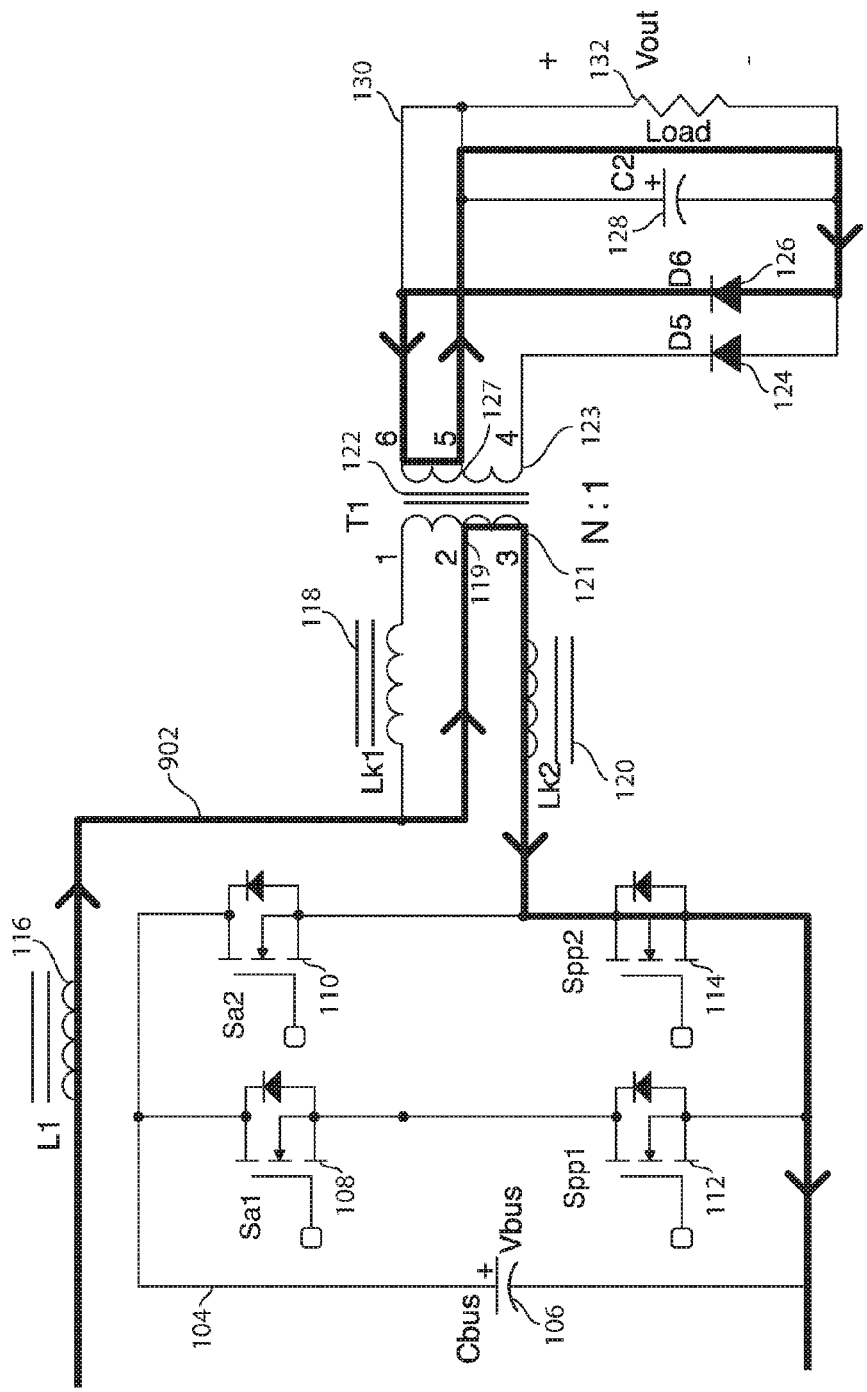
FIG. 9 is a circuit diagram illustrating operation of a portion of an AC-DC converter in a fourth mode of operation according to aspects described herein.

As shown in FIG. 5, in a fourth mode of operation, the controller 105 provides a high control signal 504 to the gate of push-pull switch Spp2 114 to operate the switch Spp2 114 to close and low control signals 502, 506, 508 to the gates of switches Spp1 112, Sa1 108, and Sa2 110 to maintain each of the switches 108, 110, 112 in an open state. FIG. 9 is a circuit diagram illustrating operation of a portion of the converter 100 in the fourth mode of operation. As shown in FIG. 9, in the fourth mode of operation, power derived from the AC input power is provided to the primary winding 121 of the transformer (T1) 122 via a power path 902 including the inductor L1 116, the center tap 119 of the primary winding 121 of the transformer (T1) 122, the inductor Lk2 120, and the push-pull switch Spp2 114. The resulting current in the primary winding 121 of the transformer (T1) 122 induces a current in the secondary winding 123 of the transformer (T1) 122 and corresponding DC power having an output DC voltage level (Vout) is provided to the output 130 (i.e., to the load 132 and to the output capacitor (C2) 128 to charge the capacitor).

Figure 10:
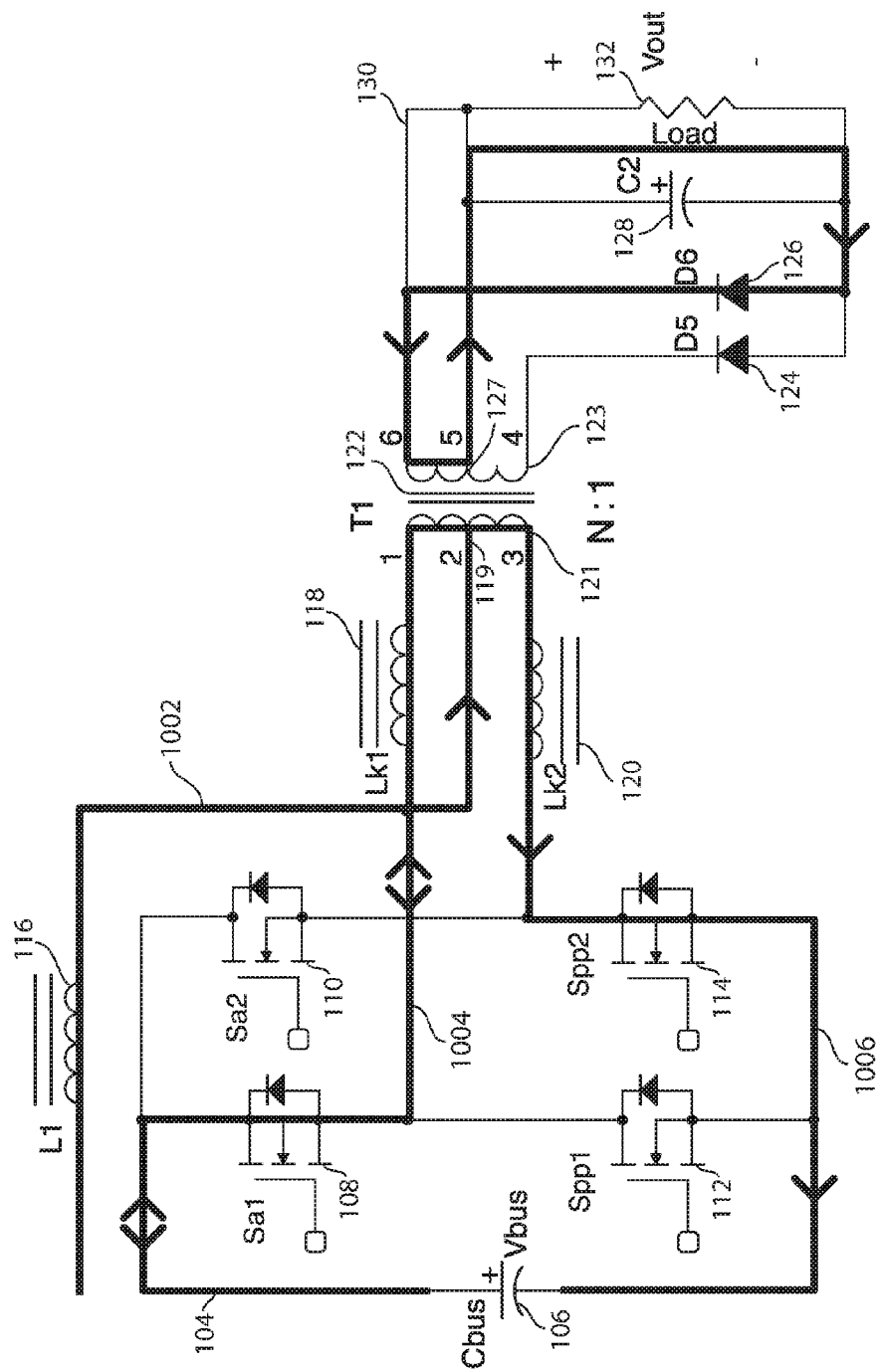
FIG. 10 is a circuit diagram illustrating operation of a portion of an AC-DC converter in a fifth mode of operation according to aspects described herein.

As shown in FIG. 5, in a fifth mode of operation, the controller 105 provides a high control signal 504 to the gate of push-pull switch Spp2 114 to maintain the switch Spp2 114 in a closed state and a high control signal 506 to the gate of active clamp switch Sa1 108 to operate the switch Sa1 108 to close. In the fifth mode of operation, the controller 105 also provides low control signals 502, 508 to the gates of switches Spp1 112 and Sa2 110 to maintain each of the switches 110, 112 in an open state. FIG. 10 is a circuit diagram illustrating operation of a portion of the converter 100 in the fifth mode of operation. As shown in FIG. 10, in the fifth mode of operation, power derived from the AC input power is provided to the center tap 119 of the primary winding 121 of the transformer (T1) 122 via a first power path 1002 including the inductor L1 116. During the fifth mode of operation, power is also provided from the center tap 119 of the primary winding 121 of the transformer (T1) 122 to the DC bus capacitor (Cbus) 106 via a second power path 1004 and back to the rectifier 102 via a third power path 1006. The second power path 904 includes a portion of the primary winding 121 of the transformer (T1) 122, the inductor Lk1 118, active clamp switch Sa1 108, and the DC bus 104. The third power path 906 includes a portion of the primary winding 121 of the transformer (T1) 122, the inductor Lk2 120, and the push-pull switch Spp2 114.

In the fifth mode of operation, the current 904 through the active clamp switch Sa1 108 is bidirectional (i.e., can either provide energy to the DC bus capacitor (Cbus) 106 or draw energy from the capacitor 106) depending on whether the voltage (Vbus) across the bus 104 is less than or greater than a voltage level between the primary winding 121 of the transformer (T1) 122 and the inductor Lk1 118. The resulting current in the primary winding 121 of the transformer (T1) 122, generated by the first, second, and third power paths 1002, 1004, 1006, induces a current in the secondary winding 123 of the transformer (T1) 122 and corresponding DC power having an output DC voltage level (Vout) is provided to the output 130 (i.e., to the load 132 and to the output capacitor (C2) 128 to charge the capacitor).

As shown in FIG. 5, in a sixth mode of operation, the controller 105 provides a high control signal 506 to the gate of active clamp switch Sa1 108 to operate the switch Sa1 108 to close and low control signals 502, 504, 508 to the gates of switches Spp1 112, Spp2, 114, and Sa2 110 to maintain each of the switches 110, 112, 114 in an open state. Operation of the converter 100 in the sixth mode of operation is relatively the same as that shown in FIG. 8. As shown in FIG. 8, in the sixth mode of operation, power derived from the AC input power is provided to the center tap 119 of the primary winding 121 of the transformer (T1) 122 via a first power path 802 including the inductor L1 116. During the third mode of operation, power is also provided from the center tap 119 of the primary winding 121 of the transformer (T1) 122 to the DC bus capacitor (Cbus) 106 via a second power path 804 and a third power path 806. The second power path includes inductor Lk2 120, a body diode of the active clamp switch Sa2 110, and the DC bus 104. The third power path includes inductor Lk1 118, the active clamp switch Sa1 108, and the DC bus 104. Also in the sixth mode of operation, the output capacitor (C2) 128 discharges and provides DC power having an output DC voltage level (Vout) to the load 132.

Figure 11:
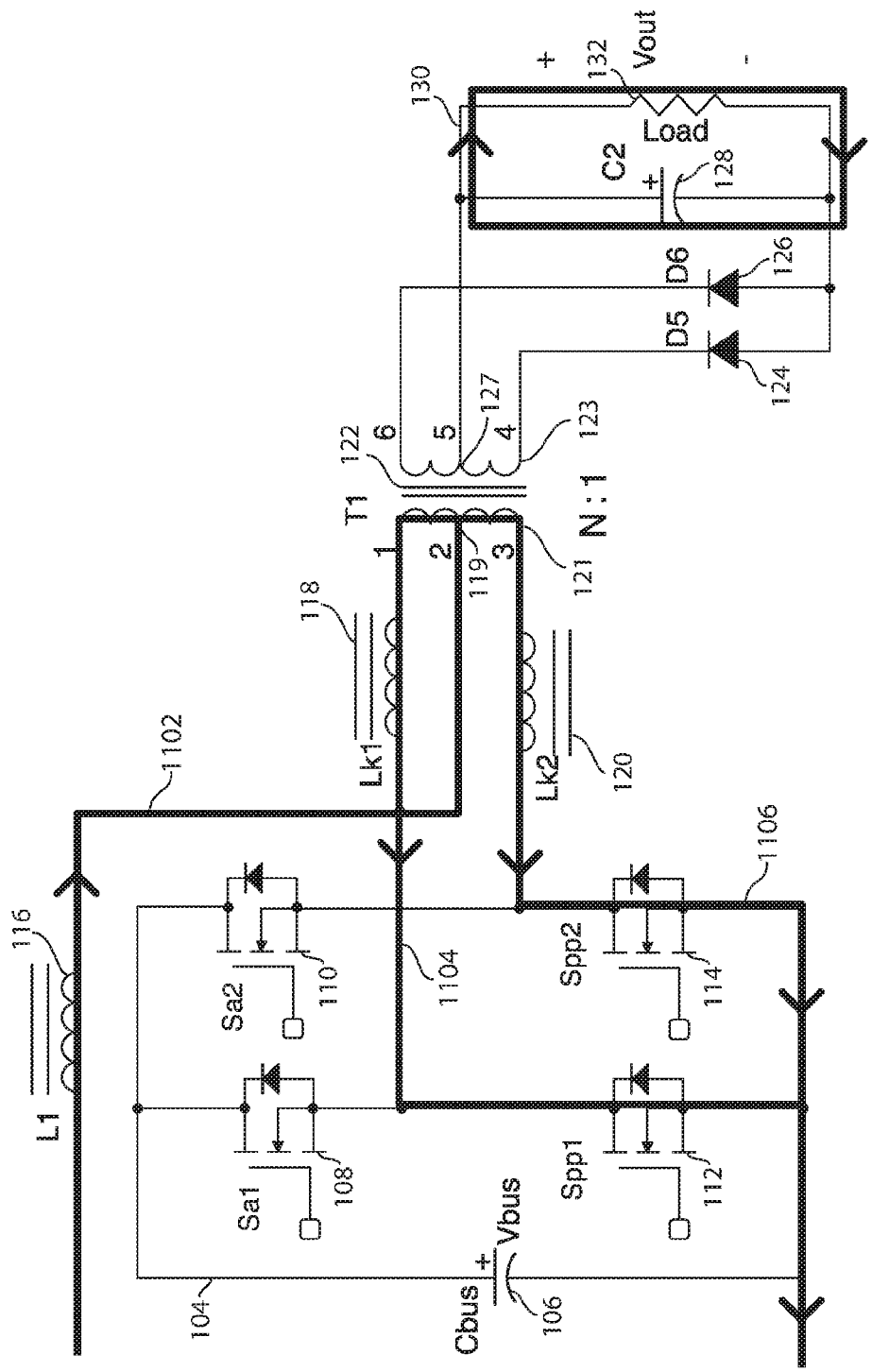
FIG. 11 is a circuit diagram illustrating operation of a portion of an AC-DC converter in a seventh mode of operation according to aspects described herein.

According to at least one embodiment, the converter may also operate in a seventh mode of operation where the duty ratios of the push-pull switch Spp1 112 and the push-pull switch Spp2 114 are both greater than 0.5. In such a seventh mode of operation, the controller 105 provides a high control signal 502 to the gate of push-pull switch Spp1 112 and a high control signal to the gate of push-pull switch Spp2 114 to operate both switches to close. In the seventh mode of operation, the controller 105 also provides low control signals 506, 508 to the gates of switches Sa1 108 and Sa2 110 to maintain each of the switches 108, 110 in an open state. FIG. 11 is a circuit diagram illustrating operation of a portion of the converter 100 in the seventh mode of operation. As shown in FIG. 11, in the seventh mode of operation, power derived from the AC input power is provided to the center tap 119 of the primary winding 121 of the transformer (T1) 122 via a first power path 1102 including the inductor L1 116. During the seventh mode of operation, power is also provided from the center tap 119 of the primary winding 121 of the transformer (T1) 122 to the rectifier 102 via a second power path 1104 and a third power path 1106. The second power path 1104 includes inductor Lk1 118 and the push-pull switch Spp1 112. The third power path 1106 includes inductor Lk2 120 and a push-pull switch Spp2 114. Also in the seventh mode of operation, the output capacitor (C2) 128 discharges and provides DC power having an output DC voltage level (Vout) to the load 132.

By controlling the converter 100 in the different modes of operation described above, the controller 105 operates the converter 100 to maintain a desired voltage (Vout) at the output 130 and to maintain the voltage level (Vbus) on the DC bus 104 at a desired level. As discussed above, the desired level of the DC bus 104 (e.g., Vbus_ref as shown in FIG. 4) is defined at a level such that a desired hold-up time of the output voltage (Vout) can be achieved when input AC power is interrupted.

When the input AC power (i.e., input AC voltage (Vac)) is unacceptable (i.e., falls below a level necessary to generate the desired DC output voltage and/or is interrupted), the controller 105 operates the push-pull switches (Spp1 112 and Spp2 114) and the active clamp switches (Sa1 108 and Sa2 110) in a full-bridge phase shift or full-bridge Pulse Width Modulation (PWM) mode to extend the hold-up time of the converter 100 by drawing energy stored in the DC bus capacitor (Cbus) 106. For example, according to at least one embodiment, a DC bus capacitor (Cbus) 106 having a capacitance of 250 µF supplies 1500 W for 10 ms in a hold-up mode. In other embodiments, the DC bus capacitor may be configured with another appropriate capacitance. Operation of the converter 100 in a hold-up mode of operation is discussed in greater detail below with respect to FIGS. 12-15.

Figure 12:
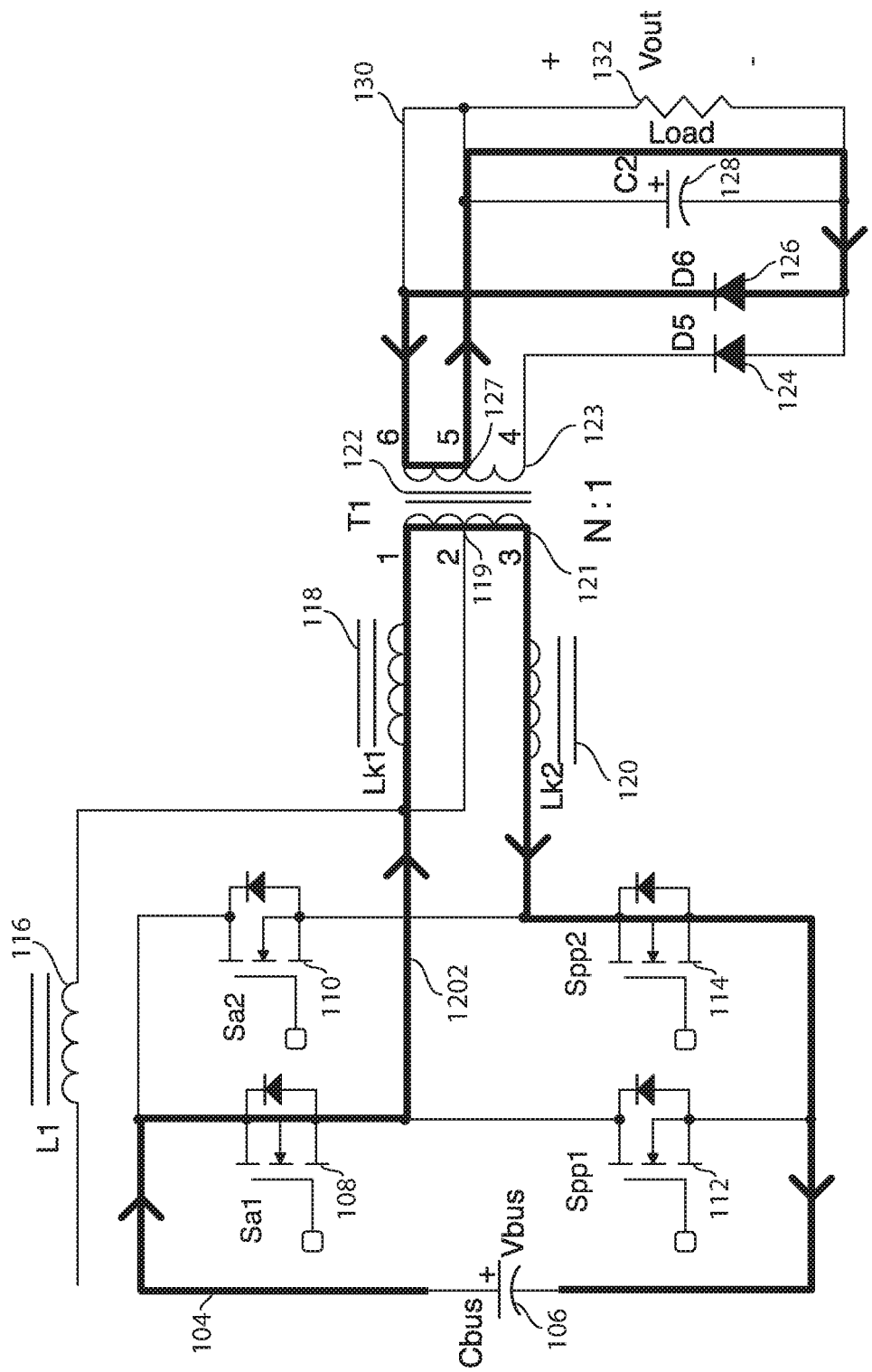
FIG. 12 is a circuit diagram illustrating operation of an AC-DC converter in a first stage of a hold-up mode of operation according to aspects described herein.
Figure 13:
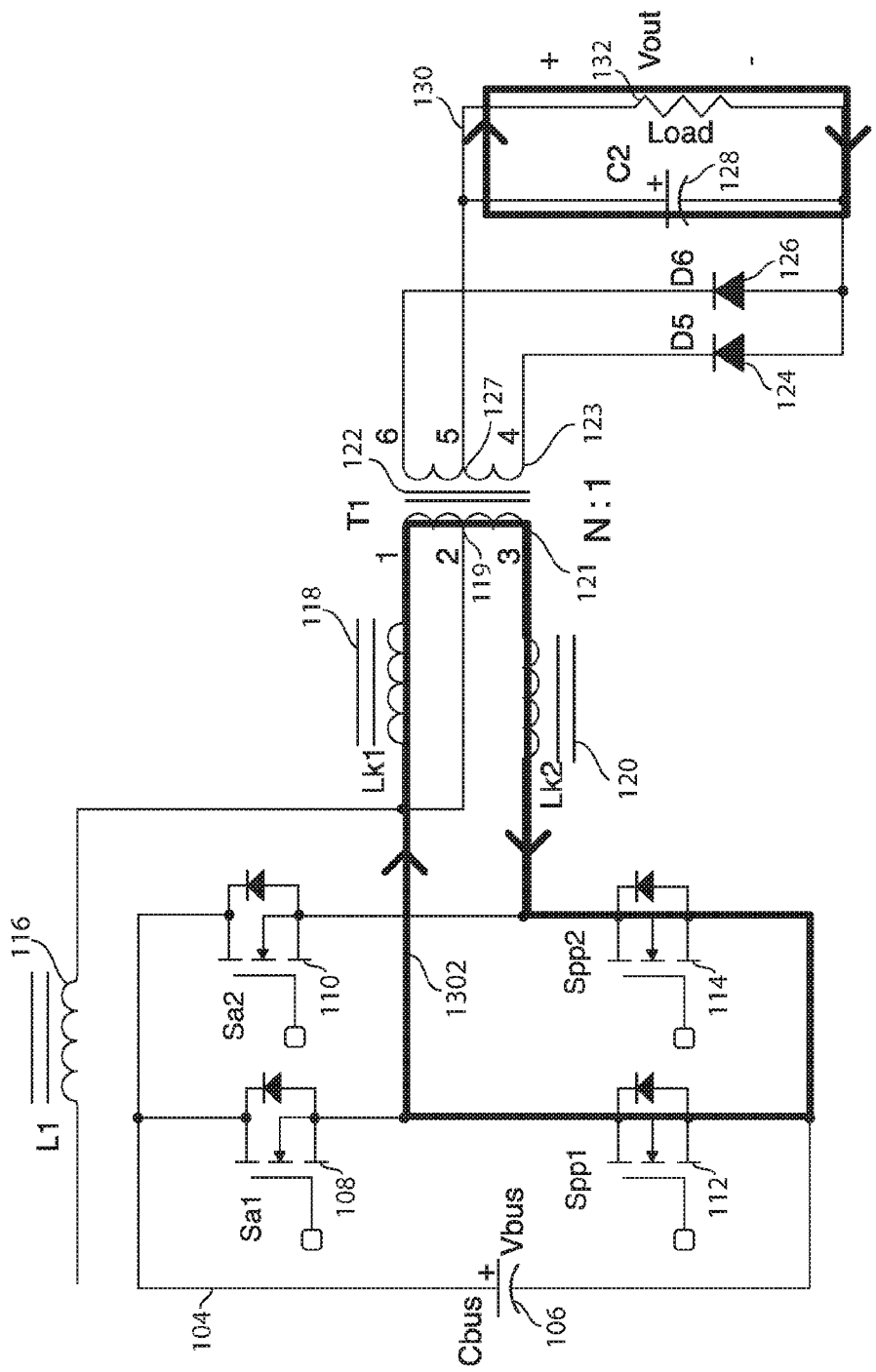
FIG. 13 is a circuit diagram illustrating operation of an AC-DC converter in a second stage of a hold-up mode of operation according to aspects described herein.
Figure 14:
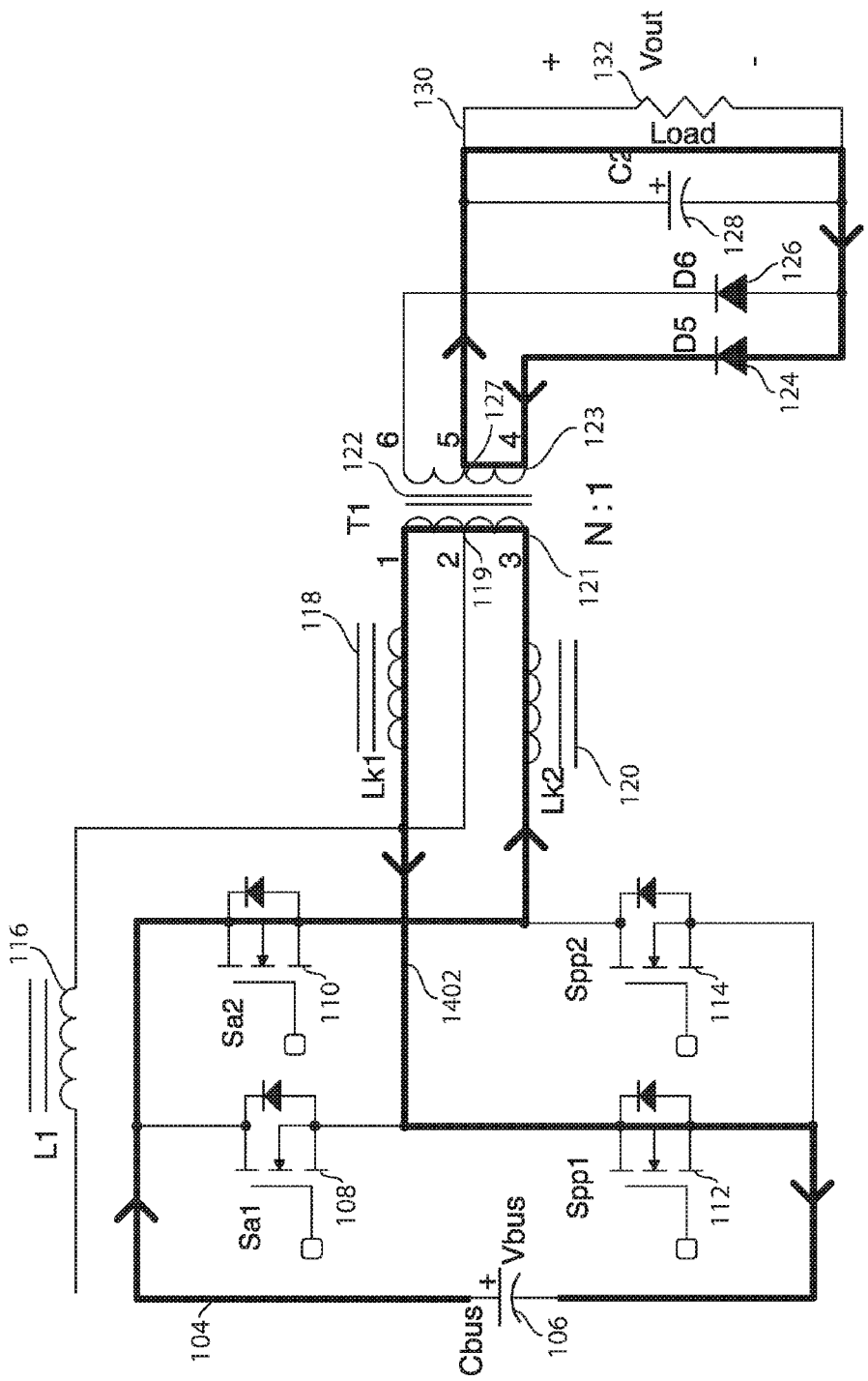
FIG. 14 is a circuit diagram illustrating operation of an AC-DC converter in a third stage of a hold-up mode of operation according to aspects described herein.
Figure 15:
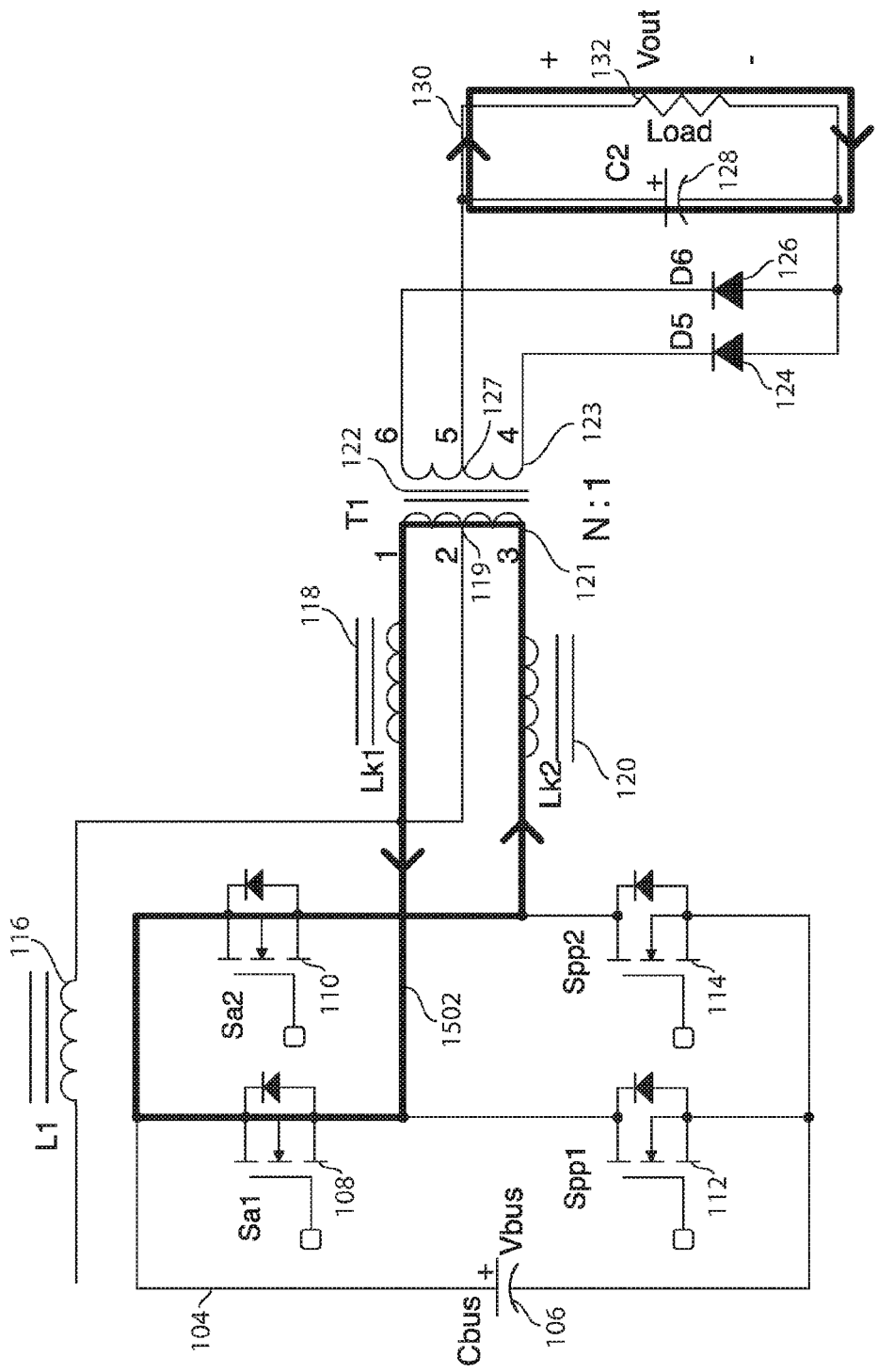
FIG. 15 is a circuit diagram illustrating operation of an AC-DC converter in a fourth stage of a hold-up mode of operation according to aspects described herein.

FIGS. 12-15 illustrate operation of the converter 100 in the hold-up mode of operation when the input AC power (Vac) is interrupted. FIG. 12 illustrates operation of the converter 100 in a first stage of the hold-up mode of operation, FIG. 13 illustrates operation of the converter 100 in a second stage of the hold-up mode of operation, FIG. 14 illustrates operation of the converter 100 in a third stage of the hold-up mode of operation, and FIG. 15 illustrates operation of the converter 100 in a fourth state of the hold-up mode of operation.

As shown in FIG. 12, in the first stage of the hold-up mode of operation, the controller 105 provides a high control signal 504 to the gate of push-pull switch Spp2 114 to operate the switch Spp2 114 in a closed state and a high control signal 506 to the gate of active clamp switch Sa1 108 to operate the switch Sa1 108 to close. In the first stage of the hold-up mode of operation, the controller 105 also provides low control signals 502, 508 to the gates of switches Spp1 112 and Sa2 110 to maintain each of the switches in an open state. As shown in FIG. 12, in the first stage of the hold-up mode of operation, power drawn from the DC bus capacitor 106 is provided to the primary winding 121 of the transformer (T1) 122 via a power path 1202 including the DC bus 104, the active clamp switch Sa1 108, the inductor Lk1 118, the primary winding 121 of the transformer (T1) 122, the inductor Lk2 120, and the push-pull switch Spp2 114. The resulting current in the primary winding 121 of the transformer (T1) 122 induces a current in the secondary winding 123 of the transformer (T1) 122 and corresponding DC power having an output DC voltage level (Vout) is provided to the output 130 (i.e., to the load 132 and to the output capacitor (C2) 128 to charge the capacitor).

In the second stage of the hold-up mode of operation, the controller 105 provides a high control signal 504 to the gate of push-pull switch Spp2 114 to operate the switch Spp2 114 in a closed state and a high control signal 502 to the gate of push-pull switch Spp1 112 to operate the switch Spp1 112 to close. In the second stage of the hold-up mode of operation, the controller 105 also provides low control signals 506, 508 to the gates of switches Sa1 108 and Sa2 110 to maintain each of the switches in an open state. As shown in FIG. 13, in the second stage of the hold-up mode operation, the output capacitor (C2) 128 discharges and output DC power having an output DC voltage level (Vout) is provided to the output 130. Also in the second stage of the hold-up mode of operation, a power path 1302 is generated that includes the push-pull switch Spp1 112, the inductor Lk1 118, the primary winding 121 of the transformer (T1) 122, the inductor Lk2 120, and the push-pull switch Spp2 114.

In the third stage of the hold-up mode of operation, the controller 105 provides a high control signal 502 to the gate of push-pull switch Spp1 112 to operate the switch Spp1 112 in a closed state and a high control signal 508 to the gate of active clamp switch Sa2 110 to operate the switch Sa2 110 to close. In the third stage of the hold-up mode of operation, the controller 105 also provides low control signals 504, 506 to the gates of switches Spp2 114 and Sa1 108 to maintain each of the switches in an open state. As shown in FIG. 14, in the third stage of the hold-up mode of operation, power drawn from the DC bus capacitor 106 is provided to the primary winding 121 of the transformer (T1) 122 via a power path 1402 including the DC bus 104, the active clamp switch Sa2 110, the inductor Lk2 120, the primary winding 121 of the transformer (T1) 122, the inductor Lk1 118, and the push-pull switch Spp1 112. The resulting current in the primary winding 121 of the transformer (T1) 122 induces a current in the secondary winding 123 of the transformer (T1) 122 and corresponding DC power having an output DC voltage level is provided to the output 130 (i.e., to the load 132 and to the output capacitor (C2) 128 to charge the capacitor).

In the fourth stage of the hold-up mode of operation, the controller 105 provides a high control signal 506 to the gate of active clamp switch Sa1 108 to operate the switch Sa1 108 in a closed state and a high control signal 508 to the gate of active clamp switch Sa2 110 to operate the switch Sa2 110 to close. In the fourth stage of the hold-up mode of operation, the controller 105 also provides low control signals 502, 504 to the gates of switches Spp1 112 and Spp2 114 to maintain each of the switches in an open state. As shown in FIG. 15, in the fourth stage of the hold-up mode operation, the output capacitor (C2) 128 discharges and DC power having an output DC voltage level (Vout) is provided to the output 130. Also in the fourth stage of the hold-up mode of operation, a power path 1502 is generated that includes the active clamp switch Sa2 110, the inductor Lk2 120, the primary winding 121 of the transformer (T1) 122, the inductor Lk1 118, and the active clamp switch Sa1 18.

By controlling the converter 100 over the different stages of the hold-up mode of operation when the input AC power is interrupted, as discussed above, the controller 105 can operate the converter 100 to provide DC power at a desired output DC voltage level (Vout) to a load for a hold-up period of time.

As described above, a power converter is provided that outputs a constant DC voltage when input AC power is normal and continues to output the constant voltage in a hold-up extension mode of operation when input AC power provided to the converter is interrupted. When acceptable input AC power is received, the converter is operated across multiple different modes of operation to maintain a desired voltage (Vout) at the output of the converter. When acceptable input AC power is received, the converter is also operated to maintain a voltage level (Vbus) on a DC bus in the converter at a desired level. The desired level of the DC bus can be defined at a level such that a hold-up time of the output voltage (Vout) can be achieved despite the AC power interruption. When input AC power is interrupted, the converter is operated across multiple stages of a hold-up mode of operation to draw power from the DC bus and provide DC power at the desired voltage (Vout) to a load for a hold-up period of time. As described above, the converter operates without employing the, typically large and costly, intermediate converters and large bulk capacitors as commonly used in such converters.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:
1. An AC-DC converter system comprising:
an input configured to receive input AC power from an AC source;
an output configured to provide output DC power having an output DC voltage to a load;
a rectifier coupled to the input;
a capacitor coupled to the rectifier; a DC bus coupled to the capacitor;
a plurality of first switches coupled to the DC bus;
a plurality of second switches coupled between the rectifier and the plurality of first switches;
a transformer having a primary winding and a secondary winding, the primary winding coupled to the plurality of first switches, the plurality of second switches, and the rectifier, and the secondary winding coupled to the output; and
a controller configured to monitor the input AC power and, in response to a determination that the input AC power is acceptable, to: operate the plurality of second switches and the plurality of first switches such that the output DC voltage is maintained at a desired output DC voltage level; and
operate the plurality of first switches such that a DC bus voltage on the DC bus is maintained at a desired DC bus voltage level, wherein in operating the plurality of second switches and the plurality of first switches such that the output DC voltage is maintained at the desired output DC voltage level, the controller is further configured to operate the plurality of second switches and the plurality of first switches in a complementary manner.

2. The AC-DC converter system of claim 1, wherein in operating the plurality of first switches such that a DC bus voltage on the DC bus is maintained at a desired DC bus voltage level, the controller is further configured to reduce a duty cycle of a control signal provided to the plurality of first switches in response to the DC bus voltage approaching the desired DC bus voltage level.

3. The AC-DC converter system of claim 1, further comprising a first inductor, wherein the primary winding of the transformer includes a center tap and wherein the center tap is coupled to the rectifier via the first inductor.

4. The AC-DC converter system of claim 3, further comprising a second inductor, wherein the primary winding is coupled to the plurality of first switches via the second inductor.

5. The AC-DC converter system of claim 4, further comprising a third inductor, wherein the primary winding is coupled to the plurality of second switches via the third inductor.

6. The AC-DC converter system of claim 1, wherein in response to a determination that the input power is unacceptable, the controller is further configured to operate, in a hold-up mode of operation, the plurality of second switches and the plurality of first switches to draw energy from the capacitor such that the output DC voltage is maintained at the desired output DC voltage level for a hold-up period of time.

7. The AC-DC converter system of claim 6, wherein the hold-up period of time is at least 10 ms.

8. The AC-DC converter system of claim 6, wherein in operating the plurality of second switches and the plurality of first switches in the hold-up mode of operation, the controller is further configured to operate the plurality of second switches and the plurality of first switches in a full-bridge phase shift mode of operation.

9. The AC-DC converter system of claim 6, wherein in operating the plurality of second switches and the plurality of first switches in the hold-up mode of operation, the controller is further configured to operate the plurality of second switches and the plurality of first switches in a full-bridge Pulse Width Modulation (PWM) mode of operation.

10. A method for operating an AC-DC converter system comprising an input, an output, a rectifier coupled to the input, a capacitor coupled to the rectifier, a DC bus coupled to the capacitor, a plurality of first switches coupled to the DC bus, a plurality of second switches coupled between the rectifier and the plurality of first switches, and a transformer having a primary winding and a secondary winding, the primary winding coupled to the plurality of first switches, the plurality of second switches, and the rectifier, and the secondary winding coupled to the output, wherein the method comprises acts of:
receiving input AC power at the input from an AC source;
determining whether the input AC power is acceptable;
in response to a determination that the AC power is acceptable, operating the plurality of second switches and the plurality of first switches such that an output DC voltage level is maintained at the output; and
in response to a determination that the AC power is acceptable, operating the plurality of first switches such that a DC bus voltage level is maintained on the DC bus,
wherein the act of operating the plurality of second switches and the plurality of first switches such that the output DC voltage level is maintained at the output includes operating the plurality of second switches and the plurality of first switches in a complementary manner.

11. The method of claim 10, wherein the act of operating the plurality of second switches and the plurality of first switches such that the output DC voltage level is maintained at the output further includes acts of:
monitoring the output DC voltage level;
comparing the output DC voltage level to a reference output voltage level; and
operating, based on the act of comparing the output DC voltage level to the reference output voltage level, the plurality of second switches and the plurality of first switches to drive the output DC voltage level towards the reference output voltage level.

12. The method of claim 11, wherein the act of operating the plurality of first switches such that the DC bus voltage level is maintained on the DC bus further includes acts of:
monitoring the DC bus voltage level;
comparing the DC bus voltage level to a reference bus voltage level; and
operating, based on the act of comparing the DC bus voltage level to the reference bus voltage level, the plurality of first switches to drive the DC bus voltage level towards the reference bus voltage level.

13. The method of claim 12, wherein the act of operating the plurality of first switches to drive the DC bus voltage level towards the reference bus voltage level includes reducing a duty cycle of a control signal provided to the plurality of first switches in response to the DC bus voltage approaching the desired DC bus voltage level.

14. The method of claim 13, wherein reducing the duty cycle of the control signal includes reducing the duty cycle of the control signal by a factor of K, and
wherein the method further comprises an act of calculating, with a Proportional-Integral (PI) controller based on the act of comparing the DC bus voltage level to the reference bus voltage level, the factor of K.

15. The method of claim 10, wherein the method further comprises:
in response to a determination that the AC power is unacceptable, operating, in a hold-up mode of operation, the plurality of second switches and the plurality of first switches to draw energy from the capacitor such that the output DC voltage level is maintained at the output for a hold-up period of time.

16. The AC-DC converter system of claim 15, wherein operating the plurality of second switches and the plurality of first switches in the hold-up mode of operation includes operating the plurality of second switches and the plurality of first switches in one of a full-bridge phase shift mode of operation and a full-bridge PWM mode of operation.

17. An AC-DC converter system comprising:
an input configured to receive input AC power from an AC source;
an output configured to provide output DC power having an output DC voltage to a load;
a rectifier coupled to the input;
a capacitor coupled to the rectifier;
a DC bus coupled to the capacitor;

a transformer coupled between the rectifier and the output;

means for maintaining an output DC voltage level at the output when the input AC power received at the input is acceptable; and means for maintaining a DC bus voltage on the DC bus at a desired DC bus voltage level when the input AC power received at the input is acceptable by reducing a duty cycle of a control signal provided to the AC-DC converter system in response to the DC bus voltage on the DC bus approaching the desired DC bus voltage level.

18. The AC-DC converter system of claim 17, further comprising means for maintaining the output DC voltage level at the output for a hold-up period of time when the input AC power received at the input is unacceptable.

\* \* \* \* \*